United States Patent
Li et al.

(10) Patent No.: US 9,157,357 B2
(45) Date of Patent: Oct. 13, 2015

(54) METHOD OF OPERATING A FUEL PROCESSOR INTERMITTENTLY

(75) Inventors: Xuantian Li, Vancouver (CA); William Allison Logan, Victoria (CA); Christopher Gordon Stoner, Vancouver (CA); Andre Boulet, Vancouver (CA); Erik Paul Johannes, Burnaby (CA); Paul Sebright Towgood, Vancouver (CA); Jacobus Neels, Rosedale (CA)

(73) Assignee: WESTPORT POWER INC., Vancouver, BC (CA)

(*) Notice: Subject to any disclaimer, the term of this patent is extended or adjusted under 35 U.S.C. 154(b) by 0 days.

(21) Appl. No.: 13/214,046

(22) Filed: Aug. 19, 2011

(65) Prior Publication Data

US 2012/0144803 A1    Jun. 14, 2012

Related U.S. Application Data

(63) Continuation of application No. PCT/CA2010/000244, filed on Feb. 19, 2010.

(60) Provisional application No. 61/154,261, filed on Feb. 20, 2009, provisional application No. 61/291,723, filed on Dec. 31, 2009.

(51) Int. Cl.
*C01B 3/36* (2006.01)
*F01N 3/20* (2006.01)
(Continued)

(52) U.S. Cl.
CPC ............... *F01N 3/2073* (2013.01); *C01B 3/36* (2013.01); *F02D 19/022* (2013.01);
(Continued)

(58) Field of Classification Search
CPC ..................................................... B01J 19/0026
See application file for complete search history.

(56) References Cited

U.S. PATENT DOCUMENTS 3,992,165 A * 11/1976 Newkirk ...................... 48/214 R
4,097,366 A *  6/1978 Tanaka et al. ................. 208/127
(Continued)

FOREIGN PATENT DOCUMENTS

WO    2008101334 A    8/2008
WO    2008131562 A    11/2008

OTHER PUBLICATIONS

International Preliminary Report on Patentability issued on Aug. 23, 2011, in connection with International Application No. PCT/CA2010/000244.
(Continued)

*Primary Examiner* — Imran Akram
(74) *Attorney, Agent, or Firm* — Corridor Law Group, P.C.

(57) ABSTRACT

In situations where the demand for syngas is intermittent, a fuel processor is operated to provide a high absolute hydrogen and carbon monoxide production, rather than to give a high fuel-specific hydrogen and carbon monoxide production. When a syngas generator is operated to intermittently produce syngas, a heating process can be performed between periods of syngas demand in order to keep the fuel processor within a desired temperature range. The heating process can comprise various steps or events including performing a heating event, allowing a standby period, and/or performing a carbon conversion event. Carbon formed during the process of converting fuel to syngas can be advantageously converted to maintain the temperature of the fuel processor within a desired range in between periods of syngas demand. A predictive method can be employed to control at least a portion of the heating process.

16 Claims, 5 Drawing Sheets

(51) Int. Cl.
*F02M 25/12* (2006.01)
*F02M 21/02* (2006.01)
*F02D 19/02* (2006.01)

(52) U.S. Cl.
CPC ...... *F02M 21/0206* (2013.01); *F02M 21/0215* (2013.01); *F02M 21/0227* (2013.01); *F02M 25/12* (2013.01); *F01N 2240/30* (2013.01); *Y02T 10/121* (2013.01); *Y02T 10/32* (2013.01)

(56) References Cited

U.S. PATENT DOCUMENTS

| | | | | |
|---|---|---|---|---|
| 5,894,728 | A | * | 4/1999 | Wakamoto ................. 60/286 |
| 5,980,596 | A | * | 11/1999 | Hershkowitz et al. ....... 48/127.9 |
| 6,113,388 | A | * | 9/2000 | Martin et al. .................. 432/128 |
| 2003/0031901 | A1 | * | 2/2003 | Breuer et al. .................... 429/20 |
| 2003/0101713 | A1 | | 6/2003 | Dalla Betta et al. |
| 2004/0265194 | A1 | * | 12/2004 | Carroni et al. ................ 422/212 |
| 2004/0265223 | A1 | | 12/2004 | Etievant et al. |
| 2008/0209891 | A1 | * | 9/2008 | Johannes et al. ................ 60/287 |
| 2008/0245749 | A1 | * | 10/2008 | Matveev ....................... 210/787 |
| 2009/0218821 | A1 | * | 9/2009 | Elkady et al. ................... 290/52 |

OTHER PUBLICATIONS

International Search Report issued on May 27, 2010, in connection with International Application No. PCT/CA2010/000244.

Written Opinion of the International Searching Authority issued on May 27, 2010, in connection with International Application No. PCT/CA2010/000244.

* cited by examiner

METHOD OF OPERATING A FUEL PROCESSOR INTERMITTENTLY

CROSS-REFERENCE TO RELATED APPLICATIONS

This application is a continuation of International Application No. PCT/CA2010/000244, having an international filing date of Feb. 19, 2010, entitled "Pressure Control System And Method". The '244 international application claimed priority benefits, in turn, from U.S. Provisional Patent Application Ser. No. 61/154,261, entitled "Method of Operating a Fuel Processor Intermittently", filed on Feb. 20, 2009, and from U.S. Provisional Patent Application Ser. No. 61/291,723, entitled "Method of Reducing Fuel Consumption in an Intermittently Operated Fuel Processor", filed on Dec. 31, 2009. Each of the '244 international application, the '261 provisional application, and the '723 provisional application is hereby incorporated by reference in its entirety.

FIELD OF THE INVENTION

The present invention relates to methods of operating a fuel processor for producing a hydrogen-containing gas stream, such as a syngas stream. The present methods are particularly suitable for fuel processors operated to supply a hydrogen-containing gas stream intermittently and for fuel processors that are used in engine system applications, where rapid dynamic response and fuel economy is desired, and where space is typically limited.

BACKGROUND OF THE INVENTION

For engine systems in vehicular or other mobile applications where a supply of hydrogen is required, due to challenges related to on-board storage of a secondary fuel and the current absence of a hydrogen refueling infrastructure, hydrogen is preferably generated on-board using a fuel processor. The hydrogen-containing gas from the fuel processor can be used to regenerate (for example, including to desulfate and/or heat) one or more devices in an engine exhaust after-treatment assembly, can be used as a supplemental fuel for the engine, and/or can be used as a fuel for a secondary power source, for example, a fuel cell. In some applications, such as the latter, the hydrogen-containing gas stream from the fuel processor may require additional processing prior to use. In some applications the demand for the hydrogen-containing gas produced by the fuel processor is highly variable.

One type of fuel processor is a syngas generator (SGG) that can convert a fuel into a gas stream containing hydrogen ($H_2$) and carbon monoxide (CO), known as syngas. Air and/or a portion of the engine exhaust stream can be used as an oxidant for the fuel conversion process. Steam and/or water can optionally be added. The SGG can be conveniently supplied with a fuel comprising the same fuel that is used to operate the engine. Alternatively a different fuel can be used, although this would generally involve a separate secondary fuel source and supply system specifically for the SGG.

The thermochemical conversion of a hydrocarbon fuel to syngas is performed in an SGG at high operating temperatures with or without the presence of a suitable catalyst. Typically, a high SGG operating temperature is desired in order to increase the fuel conversion efficiency of the process, which in turn can reduce the size of the SGG. However, excessive operating temperatures can cause undesirable effects including catalyst sintering, formation of loose amorphous soot and the requirement for the use of thermally robust specialty materials. Insufficient operating temperatures can cause undesirable effects including reduced chemical kinetics, reduced stability of the reaction flame, low fuel conversion, high concentrations of unconverted hydrocarbons in the product syngas, and formation of dense, more graphitic carbon or coke.

Parameters including equivalence ratio (ER), oxygen-to-carbon ratio (O/C ratio) and operating temperature are typically controlled and adjusted in an attempt to increase the efficiency of the fuel conversion process while reducing the generally undesirable formation of carbon and other deposits, which can cause undesirable effects within the SGG and/or in downstream components. Typically, the parameter ER is employed when an oxidant stream supplied to the SGG contains molecular oxygen, for example, an air stream, while the parameter O/C ratio is employed when an oxidant stream supplied to the SGG contains primarily chemically bound oxygen.

The term equivalence ratio (ER) herein refers to the ratio between the actual amount of oxygen supplied and the theoretical stoichiometric amount of oxygen which would be required for complete combustion of the fuel. An ER of greater than 1 represents a fuel lean mode (excess oxygen) and a resulting product stream comprising a flue gas stream, while an ER of less than 1 represents a fuel rich mode (excess fuel) and a resulting product stream comprising syngas. The term "product stream" refers to an output stream from a fuel processor or SGG. The term oxygen-to-carbon ratio (O/C) herein refers to the ratio between the total atomic oxygen and the total atomic carbon in the reactants supplied to the SGG.

Over time, carbon accumulation can impede the flow of gases, increase the pressure drop across the SGG and its associated components, and reduce the operating life or durability of the SGG. Large accumulations of carbon also have the potential to create excessive amounts of heat that can damage the SGG if the carbon is converted (for example, combusted or oxidized or gasified) in an uncontrolled manner, for example, in a short period of time. The term carbon herein includes solid fraction particulates of carbon including elemental carbon, coke and soot, as well as carbonaceous gums, resins and other deposits.

In some applications including, for example, regeneration of a lean NOx trap (LNT) and/or a diesel particulate filter (DPF) in an engine after-treatment assembly, the demand for syngas can be intermittent at varying and various intervals; can occur between prolonged intervals, for example, minutes or hours; and can last for only a short period of time, for example, seconds or minutes. During the production of syngas, heat is generated by the exothermic reactions of the fuel conversion process, which can raise and/or maintain the temperature of an SGG within a desired range. When syngas is no longer in demand, for example, upon completion of regeneration of an exhaust after-treatment device, the production of syngas can be ceased in order to reduce fuel consumption. However, ceasing the flow of one or more reactants to the fuel processor and the production of syngas can allow the temperature of the SGG to fall. If the temperature falls below a desired threshold, additional time may be required to re-establish the desired operating temperature of the SGG. Maintaining the temperature of the SGG above a threshold can advantageously reduce the response time to produce syngas when demanded.

In one known method used to maintain the temperature of the SGG, an SGG is operated so that syngas is intermittently produced or pulsed at regular intervals. A shortcoming of this method can be a higher relative fuel consumption. In another known method, an SGG is operated so that the air-fuel ratio of the reactants is adjusted to a fuel lean mode (with an equivalence ratio of greater than 1) when syngas is not demanded. Operation of the SGG in a fuel lean mode can produce a flue gas and heat that can sustain or increase the temperature of the SGG while reducing the consumption of fuel (as compared to producing syngas). However, if fuel is supplied to the SGG continuously, the fuel consumed to maintain the temperature of the SGG can represent a substantial portion of the total fuel consumption, for example, in some cases about 50%-70% of the total fuel consumed by the SGG.

In vehicular or other mobile applications, an on-board SGG should generally be low cost, compact, light-weight, reliable, durable, and efficiently packaged with other components of the engine system. Some particular challenges associated with the design and operation of fuel processors for vehicular or other mobile applications can include the following:

(a) Increasing the output of CO and/or $H_2$ produced by the fuel processor, so that a smaller fuel processor can be used to satisfy a given syngas demand;
(b) Increasing the ratio of $H_2$ to CO in the product syngas stream;
(c) Reducing the volume and weight of the fuel processor;
(d) Reducing the cost of the fuel processor;
(e) Producing $H_2$ and CO intermittently, and responding rapidly to fluctuating demands for $H_2$ and CO;
(f) Maintaining the temperature of a fuel processor above a desired threshold temperature, in order to respond rapidly to fluctuating demands for $H_2$ and CO; and
(g) Reducing fuel consumption.

The present methods of operating a fuel processor are effective in addressing at least some of the issues discussed above, both in engine system applications, as well as in other fuel processor applications.

SUMMARY OF THE INVENTION

In one aspect, a fuel processor is operated to intermittently produce a syngas stream during first periods of time, interspersed with second periods of time. During the first periods of time, a fuel reactant stream and an oxidant reactant stream are supplied to the fuel processor and converted to produce a syngas stream comprising hydrogen ($H_2$) and carbon monoxide (CO). The fuel and oxidant reactant streams are supplied to the fuel processor at an equivalence ratio that is below that which would provide the maximum fuel-specific $H_2$+CO production, for example, for operation over a prolonged period. Thus, a syngas stream is produced intermittently with a higher instantaneous output of $H_2$+CO (for example, in moles per second) than could be achieved at an equivalence ratio which would give a high fuel conversion efficiency to $H_2$+CO (for example, in moles per kg of fuel). Carbon tends to form in the fuel processor when it is operated at such an equivalence ratio.

Carbon formed during the conversion of fuel to syngas can be advantageously trapped in the fuel processor and subsequently converted to maintain the temperature of the fuel processor within a desired range in between periods of syngas demand, for example, during the second periods of time. This can be accomplished by supplying an oxidizing stream to the fuel processor during the second periods of time to convert the carbon and generate heat. The oxidizing stream can conveniently be substantially the same as the oxidant stream used for syngas production or can be different. The oxidizing stream can comprise water (for example, steam).

In some applications of the above-described method, syngas produced by the fuel processor is at least periodically employed to regenerate an exhaust after-treatment device in an engine system.

Thus, in a method of operating an engine system comprising an engine, an exhaust after-treatment assembly, and a fuel processor, the method can comprise:
(a) operating the engine to produce an engine exhaust stream;
(b) at least periodically directing at least a portion of the engine exhaust stream to at least one exhaust after-treatment device in the exhaust after-treatment assembly, for reducing regulated emissions in the engine exhaust stream; and
(c) operating the fuel processor to intermittently produce a syngas stream comprising hydrogen ($H_2$) and carbon monoxide (CO) during first periods of time, interspersed with second periods of time, wherein during the first periods of time a fuel reactant stream and an oxidant reactant stream are supplied to the fuel processor at an equivalence ratio that is below that which would provide the maximum fuel-specific $H_2$+CO production. Preferably the equivalence ratio is at or close to a value that produces a maximum absolute $H_2$+CO production.

In another aspect of a method of operating a fuel processor to intermittently produce a syngas stream comprising hydrogen and carbon monoxide during first periods of time, interspersed with second periods of time, the method comprises:
(a) during the first periods of time, supplying a fuel reactant stream and an oxidant reactant stream to the fuel processor and converting the fuel and oxidant reactant streams in the fuel processor to produce the syngas stream;
(b) recording one or more syngas demand parameters, thereby creating a record of historical syngas demand parameters;
(c) during the second periods of time, performing a heating process; and
(d) employing a predictive method that employs the record of historical syngas demand parameters to control at least a portion of the heating process.

In some applications of the above-described method comprising a heating process, syngas produced by the fuel processor is at least periodically employed to regenerate an exhaust after-treatment device in an engine system.

Thus, in a method of operating an engine system comprising an engine, an exhaust after-treatment assembly, and a fuel processor, the method can comprise:
(a) operating the engine system to produce an engine exhaust stream;
(b) at least periodically directing at least a portion of the engine exhaust stream to at least one exhaust after-treatment device in the exhaust after-treatment assembly, for reducing regulated emissions in the engine exhaust stream;
(c) during first periods of time, supplying a fuel reactant stream and an oxidant reactant stream to the fuel processor and converting the fuel and oxidant reactant streams in the fuel processor to produce the syngas stream;
(d) recording one or more syngas demand parameters, thereby creating a record of historical syngas demand parameters;
(e) during second periods of time, which are interspersed with the first periods of time, performing a heating process, and
(f) employing a predictive method that employs the record of historical syngas demand parameters to control at least a portion of the heating process.

In some embodiments, the predictive method comprises statistical methods. The statistical methods can employ the historical syngas demand parameters.

The heating process can comprise a heating event. Preferably the equivalence ratio of reactants supplied to the fuel processor during the heating event is in the range of about 0.75 to about 0.95, and is preferably about 0.9.

The heating process can comprise, instead or in addition, a standby period and/or performing a carbon conversion event. During a carbon conversion event, the flow of the fuel stream supplied to the fuel processor is preferably shut off. During a standby period the flow of both the fuel stream and the oxidant stream supplied to the fuel processor is preferably shut off.

DETAILED DESCRIPTION OF PREFERRED EMBODIMENT(S)

Figure 1:
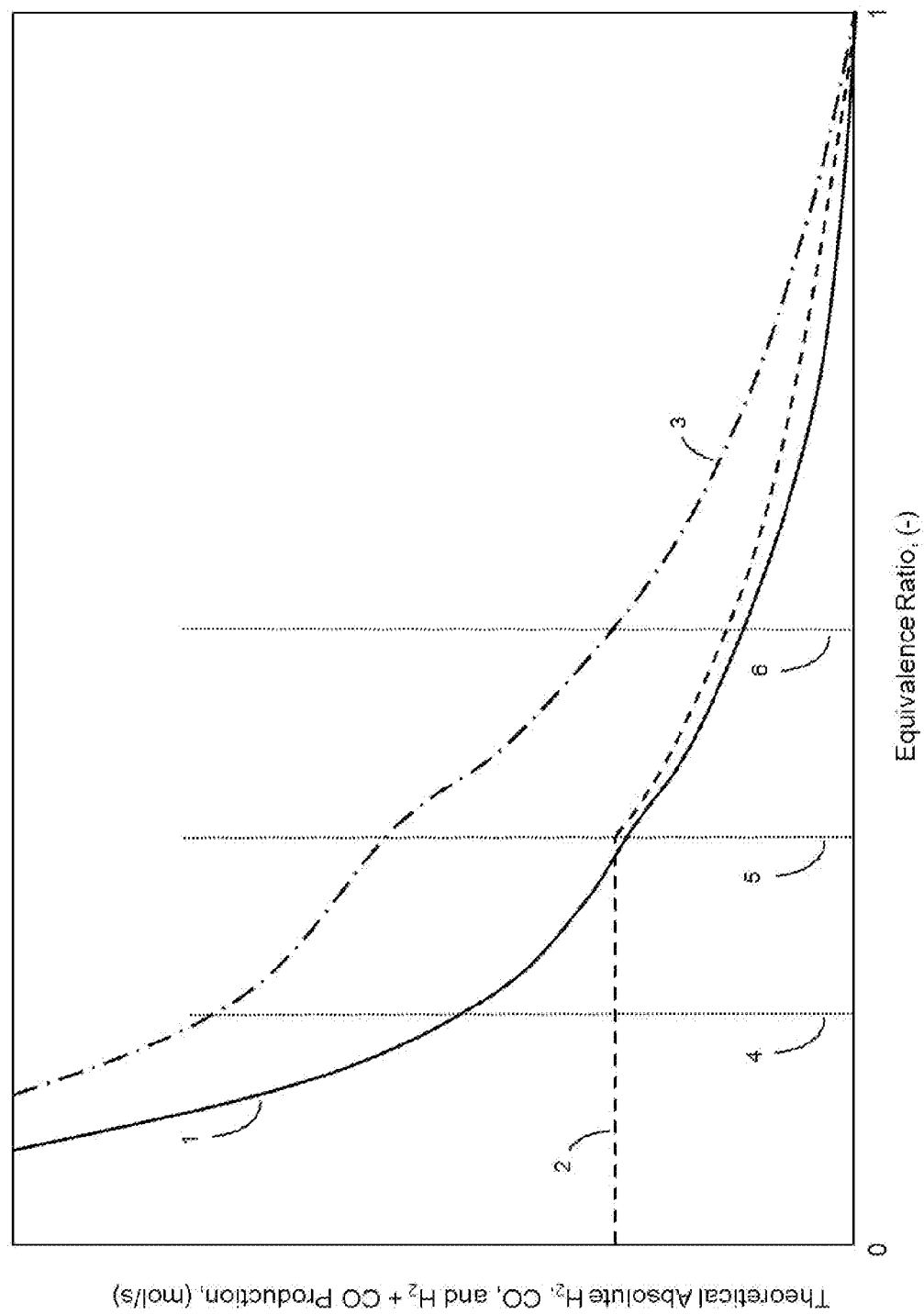
FIG. 1 is a graph (not necessarily to scale) illustrating a theoretical example of absolute $H_2$+CO production with varying equivalence ratio (ER) of the reactants supplied to a syngas generator (SGG) operating at a constant temperature and pressure.

FIG. 1 is a graphical illustration showing a theoretical prediction of how absolute $H_2$+CO production and the hydrogen-to-carbon monoxide ratio in a syngas generator (SGG) or syngas stream can vary as the equivalence ratio (ER) of the reactants supplied to the SGG is varied (in this example, by varying the fuel flow at a constant oxidant supply rate), while maintaining a constant temperature and pressure.

"Absolute $H_2$+CO production" herein refers to the rate of production of $H_2$+CO (for example, in moles per second), and is also referred to as the $H_2$+CO output. In FIG. 1, solid line 1 shows absolute $H_2$ production, dashed line 2 shows absolute CO production, and dash-dotted line 3 shows absolute $H_2$+CO production ($H_2$ and CO combined). Solid line 1, dashed line 2 and dashed-dotted line 3 are not necessarily to scale, or of the profile as shown, and can vary depending on factors including, for example, type of reactants supplied, temperature and pressure at which the fuel conversion reactions occur and heat management characteristics of the fuel processor.

As shown in FIG. 1, at an ER value indicated by dotted line 5, approximately all of the oxygen in the oxidant reactant stream supplied to the SGG is consumed by partial oxidation. This is the point at which a theoretical maximum amount of CO can be produced. Below this equivalence ratio (as more fuel is supplied) the conversion is oxygen-limited, and the CO output is expected to remain fairly constant, as indicated by the horizontal part of dashed line 2. An increased amount of carbon including, for example, coke and soot, will tend to form during the reaction process in this ER region as there is insufficient oxygen to convert more fuel to CO. Also, the concentration of unconverted hydrocarbons (primarily short-chain) in the product stream will tend to increase. Hydrogen output will theoretically continue to increase as the ER is reduced below dotted line 5 because at least some of the additional fuel is converted to hydrogen, thus the ratio of hydrogen to carbon monoxide in the syngas stream increases, as shown by the divergence of solid line 1 from dashed line 2 in this region. In the example shown, the outputs of $H_2$ and CO are approximately the same at an ER indicated by dotted line 5, but this is not necessarily the case and depends on the fuel.

FIG. 1 further shows that as the ER of the reactants supplied to the SGG is increased above the value indicated by dotted line 5 (less fuel supplied), the hydrogen output (solid line 1) and carbon monoxide output (dashed line 2) decrease, and therefore absolute $H_2$+CO production (dash-dotted line 3) decreases. The carbon dioxide ($CO_2$) output (not shown in FIG. 1) will tend to increase because of the presence of a greater proportion of oxygen in the reactant stream. The ratio of hydrogen to carbon monoxide in the syngas stream is expected to stay fairly constant in this region. At an ER of about 1 the $H_2$+CO output drops to zero as nearly all of the fuel is consumed by combustion, producing primarily $H_2O$ and $CO_2$.

Figure 2:
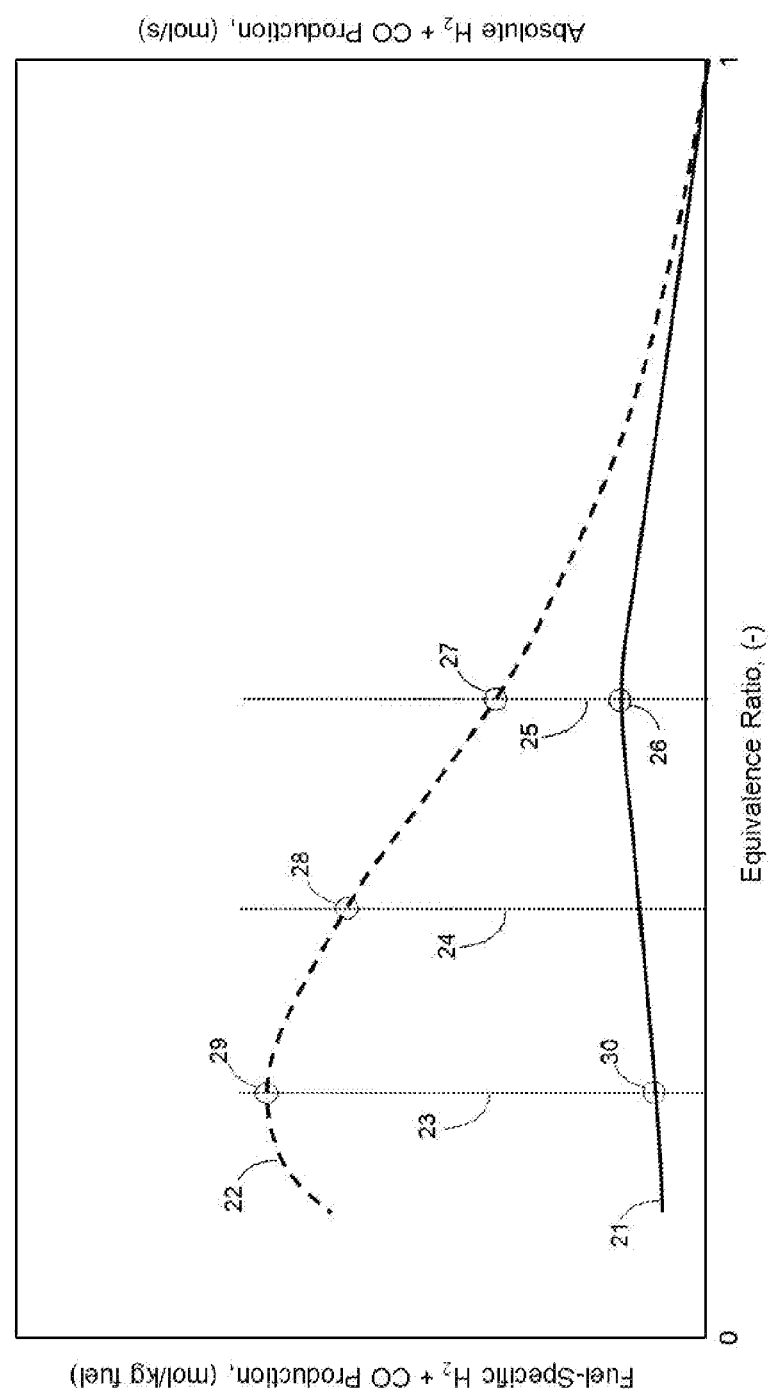
FIG. 2 is a graph (not necessarily to scale) illustrating an example of fuel-specific $H_2$+CO production and absolute $H_2$+CO production with varying equivalence ratio (ER) of the reactants supplied to an autothermal syngas generator (SGG).

FIG. 2 is a graphical illustration (not necessarily to scale) showing an example of how fuel-specific $H_2$+CO production and absolute $H_2$+CO production in an SGG or syngas stream can vary in practice as the equivalence ratio (ER) of the reactants supplied to a syngas generator (SGG) is varied, in this example, by varying the fuel flow at a constant oxidant supply rate to an autothermal SGG.

"Fuel-specific $H_2$+CO production" herein refers to the amount of $H_2$+CO produced per unit of fuel supplied, for example, the number of moles of $H_2$+CO (combined CO and $H_2$) produced per kilogram of fuel supplied. The higher the fuel-specific $H_2$+CO production the greater the efficiency of fuel conversion process to form $H_2$+CO. In FIG. 2, solid line 21 shows the fuel-specific $H_2$+CO production and dashed line 22 shows the absolute $H_2$+CO production. Solid line 21 and dashed line 22 are not necessarily to scale, or of the profile as shown, and can vary depending on factors including, for example, type of reactants supplied, temperature at which the fuel conversion reactions occur and heat management characteristics of the fuel processor.

As shown in FIG. 2, fuel-specific $H_2$+CO production reaches a peak at point 26 on solid line 21, which corresponds to an ER indicated by dotted line 25. At this ER the quantity of $H_2$+CO produced per kilogram of fuel supplied is greatest. The absolute $H_2$+CO production or $H_2$+CO output at this ER is indicated by point 27. In some embodiments this ER value is around 0.5.

As further shown in FIG. 2, by moving to a lower ER (increasing the proportion of fuel) the fuel-specific $H_2$+CO production decreases (see solid line 21), but the absolute $H_2$+CO production (or $H_2$+CO output in moles per second) increases (see dashed line 22). At an ER value indicated by dotted line 24, approximately all of the oxygen in the oxidant reactant stream supplied to the SGG is consumed by partial oxidation. Point 28 on dashed line 22 is indicative of the absolute syngas production at this ER.

The absolute $H_2$+CO production can be increased still further by reducing the ER until, at about an ER value indicated by dotted line 23, the absolute $H_2$+CO production reaches a peak (point 29). However, the fuel-specific $H_2$+CO production at this ER is lower (see point 30) meaning that more fuel is being used per mole of $H_2$+CO being produced than at point 26. In most SGGs, as the ER is reduced even further the absolute $H_2$+CO production starts to drop off rapidly because the heat available for the reforming reactions is limited. This is because the amount of the oxygen available for the exothermic partial oxidation reactions of the reactants is limited.

Thermally insulating the SGG can advantageously be employed to reduce the rate of heat loss when fuel reactant supply to the SGG is shut off or when operating the SGG at a low ER (for example, less than dotted line 23 or even dotted line 24 in FIG. 2). Thermal insulation and thermal mass can be employed to store heat when excess heat is available (when an SGG is supplied with reactants at a higher ER) and supply heat when additional heat for reforming reactions is desired (when an SGG is supplied with reactants at a lower ER).

Comparing FIGS. 1 and 2, dotted line 4 in FIG. 1 corresponds roughly to dotted line 23 in FIG. 2; dotted line 5 in FIG. 1 corresponds roughly to dotted line 24 in FIG. 2; and dotted line 6 in FIG. 1 corresponds roughly to dotted line 25 in FIG. 2.

In applications where fuel conversion efficiency is a primary concern and a syngas stream is desired for a prolonged period of time, SGGs have been selectively operated with an ER close to that indicated by dotted line 25 in FIG. 2, in order to obtain a high fuel-specific $H_2$+CO production (point 26). As well as being fuel efficient for producing $H_2$ and CO, operating with an ER near this point can also result in a reduced tendency for carbon formation during the fuel conversion process, which can allow for more extended operation of the SGG. However, operating with an ER near this point can result in a lower absolute $H_2$+CO production (point 27) than could be achieved at a lower ER.

In some applications syngas is only needed or desirable for brief, intermittent periods. For example, an engine system can employ an exhaust after-treatment assembly (which can comprise one or more exhaust after-treatment devices) to reduce the amount of regulated emissions in the exhaust stream produced from the engine system, and syngas can be employed to regenerate one or more devices within the exhaust after-treatment assembly. Typically during regeneration of an exhaust after-treatment device such as a lean $NO_x$ trap (LNT), the demand for a syngas stream is brief (for example, up to about 30 seconds) for each regeneration cycle. The interval between each regeneration cycle can be longer, for example, minutes or hours. The duration of each demand for syngas and the interval between each regeneration cycle can be variable and dependent on various factors including, for example, the size of the engine, the operating duty and cycle of the engine, quantity and size of the LNT(s). After a regeneration cycle is complete, it can be desirable to reduce the fuel consumption of the SGG by shutting-off the fuel reactant supply to the SGG or operating the SGG at an idle condition. However, these conditions can undesirably cause the temperature of the SGG to fall below a desired threshold temperature and delay the ability to produce syngas when desired.

In one embodiment an SGG can be operated to produce a syngas stream intermittently for brief periods with intervals in between, by supplying the reactants to an SGG at an ER such that the absolute $H_2$+CO production is significantly higher than it would be if the SGG were operated at or close to the maximum fuel-specific $H_2$+CO production. For example, during intermittent periods of syngas demand, the SGG is preferably operated with an ER in a range from about dotted line 24 to about dotted line 23 in FIG. 2, or more preferably with an ER at or near the ER represented by dotted line 23 in FIG. 2. Operating with an ER near dotted line 23 provides close to the maximum absolute $H_2$+CO production. For example, in applications where diesel is employed as a fuel reactant the ER for maximum absolute $H_2$+CO production is generally in the range of about 0.3 to 0.35. Operating with a high $H_2$+CO output offers the advantages of reducing the volume, weight and cost of the SGG required to satisfy a particular intermittent $H_2$+CO demand. Furthermore, the ratio of hydrogen to carbon monoxide is increased when the ER is decreased in this range (as shown by solid line 1 and dashed line 2 between dotted line 5 and dotted line 4 in FIG. 1). A syngas stream which comprises a higher hydrogen-to-carbon monoxide ratio can be beneficial in a LNT regeneration process. Such an operating regime also tends to provide a syngas stream with a decreased concentration of short chain hydrocarbons. The duration of the periods of syngas production and the intervals in between periods of syngas demand can vary during operation of the fuel processor. Also, the ER value used can vary within a particular period of syngas demand and/or among periods of syngas demand.

As mentioned above in reference to FIG. 1, when an SGG is selectively operated with an ER slightly less than or less than dotted line 5, an increased amount and/or rate of carbon formation can occur, with a tendency of coke being formed rather than soot. Although coke may have a higher density than soot, the formation of coke can be preferable over the formation of soot as coke has a tendency to collect within an SGG in a manner which impedes the flow of gasses at a reduced rate and can be easier to trap and/or control. The increased rate of carbon formation can result in a need or desire for more frequent carbon removal or conversion processes. This would generally be a disadvantage in situations where the demand for syngas is prolonged. However, in situations where the syngas demand is intermittent, carbon accumulation can actually be an advantage. Accumulated carbon can be advantageously employed to create heat to maintain the SGG above a desired temperature threshold during intervals when the production of a syngas stream is not desired.

So, an SGG can be operated to produce syngas intermittently at an ER at which some carbon accumulates within the SGG. This can be, for example, at an ER such that the absolute $H_2$+CO production is significantly higher than it would be if the SGG were operated at or close to the maximum fuel-specific $H_2$+CO production as described above, or at some other ER at which a syngas stream and carbon are produced. When an SGG is above a desired threshold temperature, for example, above the autoignition temperature of carbon and/or from about 600° C. to 1400° C., and the production of a syngas stream is no longer desired, fuel supply to the SGG can be terminated while the oxidant reactant supply (or another oxidizing stream) can be selectively introduced and adjusted to allow for the exothermic conversion (and removal) of carbon accumulated within the SGG. The conversion of carbon creates heat which can advantageously maintain the temperature of the fuel processor above a desired threshold temperature without consumption of additional fuel.

The oxygen ($O_2$) content, rate, duration and profile (or duty) at which the oxidizing stream is introduced into the SGG can be adjusted to control the rate, duration and profile at which the carbon is converted, in order to maintain the SGG within a desired temperature range while reducing the possibility of an undesirable over-temperature condition. For example, if an SGG is above a threshold temperature and carbon has accumulated within the SGG, the oxygen content, rate, duration and profile at which an oxidizing stream is introduced can be controlled in a manner to maintain the temperature above the desired threshold temperature and within a desired temperature range for the period that the syngas stream is not desired (or fuel supply is not desired). This can also maintain the carbon accumulation level within the SGG below a desired threshold value. Also optionally, the oxidizing stream can comprise a water-containing stream can be selectively adjusted and introduced, at least periodically, with or without another oxidant stream to convert the carbon. The profile at which the oxidizing stream is controlled and introduced can vary within a cycle and from one cycle to another.

Controlled conversion of accumulated carbon within the SGG without the use of the fuel offers the advantage of reducing the fuel consumption of the SGG. Optionally, if the amount of carbon accumulated is insufficient to maintain the temperature above the desired threshold over the desired period, fuel reactant can be selectively introduced to maintain the temperature of the SGG over a portion of the period.

In another method embodiment, an SGG can be selectively operated to produce a syngas stream at least periodically with an ER less than dotted line 24 in FIG. 2 and operated at least periodically with an ER greater than dotted line 24 to maintain the temperature of the fuel processor above a desired threshold temperature. The method offers the advantage of producing the CO and $H_2$ as desired, while maintaining the temperature of the fuel processor above a desired temperature threshold and within a desired temperature range.

Embodiments of the above described methods are particularly suited to applications where syngas is needed or desired intermittently for fairly short periods, for example, a few seconds up to about a few minutes, with intervals in between periods of syngas demand of up to several hours.

Regardless of the ER used during periods of syngas demand, an intermittent heating process can be beneficially employed to maintain the temperature of a fuel processor between periods of syngas demand, while reducing fuel consumption. An intermittent heating process can be used to elevate the temperature of a fuel processor immediately prior to the production of syngas (in order to increase the quality, or hydrogen and carbon monoxide concentration, of the syngas, when syngas is produced at a prescribed equivalence ratio). The heating process can comprise one or more heating events, one or more standby periods, and/or one or more carbon conversion events as described in more detail below. However, the nature and timing of the intermittent heating process can affect fuel consumption and quality of syngas. A heating event that occurs at the wrong time and/or for the wrong duration can result in an unnecessary or excess amount of fuel being consumed. An ineffective heating event can increase the fuel penalty, operating cost, and reduce the response time to produce syngas. In applications where advance notice of future syngas demand is not available, employing predictive methods based on historical syngas demand parameters to determine when to perform intermittent heating processes and events within the heating process for the fuel processor can be advantageous.

In engine systems comprising an engine, a fuel processor and an exhaust after-treatment assembly, advance notice of future syngas demand may not be generally available. The fuel processor can be employed to produce a product stream that can be introduced into an exhaust after-treatment device at least periodically in order to regenerate the device. The term "product stream" herein refers to an output stream from a fuel processor, including, for example, a hydrogen-containing stream, a syngas stream or a flue gas stream (the latter obtained through complete or almost complete combustion of the fuel within the fuel processor). The composition of the product stream depends upon the ER of reactant supplied to the fuel processor, among other things. The demand for the product stream is often brief (for example, a few seconds up to about a few minutes) for each regeneration cycle, with an interval between each regeneration cycle that can be up to several hours of operation. In some applications including, for example, an engine system designed and manufactured by an original equipment manufacturer (OEM), engine information can be available and employed by a control system for the fuel processor to provide advance warning of a future product stream demand. However, in other applications including, for example, after-market retrofit of an exhaust after-treatment assembly for an engine system, engine information that can provide advance warning of a future product stream demand may not be available. In the latter-described application, a control method for the fuel processor can beneficially record and collect historical parameters including, for example, SGG product stream demand parameters, and employ statistical methods to predict future demand.

Typically, fuel processors can be controlled with a programmable controller that can optionally control or receive signals from other systems, assemblies, subassemblies, control systems and sensors; for example, a controller can control a fuel processor and an exhaust after-treatment assembly of an engine system. A controller employed to control the operation of an SGG is herein referred to as an "SGG controller".

Figure 3:
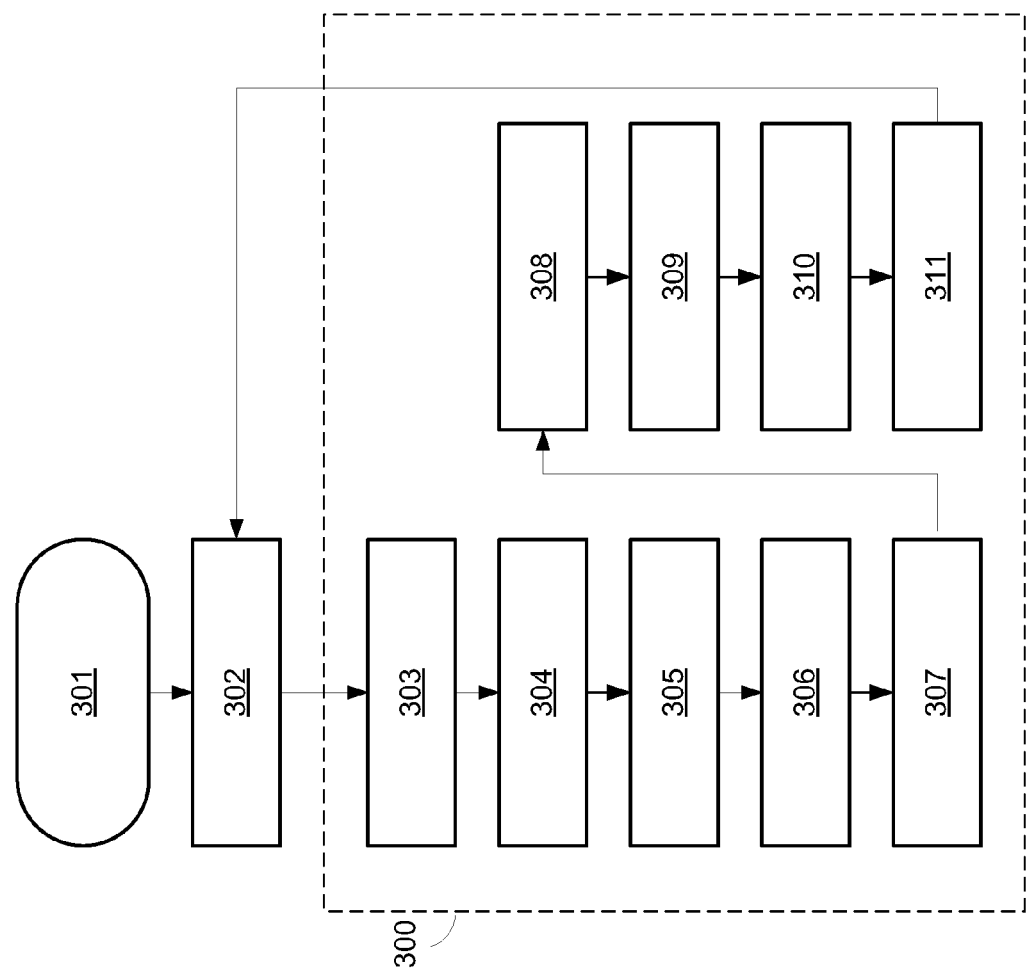
FIG. 3 is a flow chart of an example heating process for a syngas generator (SGG) in applications where the demand for a product stream is intermittent. The heating process can reduce fuel consumption and the time to produce a product stream when a demand occurs by maintaining the temperature of the SGG above a desired temperature threshold.

FIG. 3 is a flow chart of an example of a syngas generator (SGG) operating process incorporating an embodiment of an SGG heating process 300 particularly suitable for use in applications where the demand for a product stream is intermittent. The heating process can maintain the temperature of the SGG above a desired temperature threshold by periodically operating the SGG in a fuel lean or fuel rich mode to produce heat (herein referred to as a "heating event"), as well as optionally allowing a standby period, for example, by periodically discontinuing the flow of reactants to the SGG to reduce heat loss and fuel consumption. In addition, one or more carbon conversion events can be optionally employed to produce heat in order to maintain the temperature of the SGG for a prolonged period with a reduced amount of fuel reactant consumed. The steps or events within a heating process, for example, heating events, standby periods and carbon conversion events, can occur in various sequences and cycles as desired.

The process illustrated in FIG. 3 starts at step 301 with the SGG operating within a desired operating temperature range, optionally producing syngas (for example, with an ER of about 0.75 to 0.95) when an SGG controller determines or receives a demand for syngas. At step 302 the parameters for the fuel and oxidant reactants can be determined by the SGG controller and the fuel and oxidant reactants supplied to the SGG can be adjusted according to the syngas demand. For example, in applications where a high hydrogen ($H_2$) and carbon monoxide (CO) yield is desired and diesel is employed as a fuel reactant, the ER in step 302 is preferably in a range of about 0.3 to 0.35. When the SGG controller determines or receives a signal that the demand for syngas has ended or will end, the production of syngas can be terminated (for example, the flow of the fuel and oxidant reactants supplied to the SGG can be reduced and/or stopped). The illustrated embodiment of a heating process 300 starts at step 303 where the events and parameters for heating process 300 can be determined by the SGG controller based on at least one recorded historical syngas demand parameter(s) and algorithm(s), optionally employing statistical methods. The events within heating process 300 can comprise, for example, one or more carbon conversion events, one or more standby periods, and/or one or more heating events. The parameters can be properties employed to determine, trigger and/or control the events including, for example, start time of events, duration of events, lower temperature threshold values, upper temperature threshold values and algorithms. Optionally, a timer is employed to monitor elapsed time; in step 303, the timer can be started and the start time recorded.

In step 304 the SGG controller determines the parameters for, starts and conducts a carbon conversion event to heat the SGG by converting carbon accumulated within the SGG (which can occur during the production of syngas, for example, during steps 301 and/or 302). The exothermic carbon conversion reaction can be triggered by enabling a small portion, for example, less than 30% of the rated flow, of an oxidizing stream, for example, an oxidant reactant into the SGG at elevated temperatures, for example, above approximately 600° C. Preferably, heat released during the carbon conversion event compensates for most or all the total heat loss from an SGG, for example, heat carried out of the SGG by the flow of reactants and heat loss from the surface of the SGG to the surrounding environment, in order to maintain the temperature of the SGG for a prolonged period. Controlling the rate at which the accumulated carbon is converted can be accomplished through controlling the absolute mass flow or molar flux of oxygen introduced into the SGG during a carbon conversion event. This can reduce the potential of creating excessive temperatures and damage to the SGG (if the heating duty is too high), and reduce the tendency for the temperature of the SGG to fall (if the heating duty is too low). Preferably, the flow of fuel reactant can remain shut off in order to reduce fuel consumption. Optionally, the flow of a fuel reactant can be employed to assist the event, for example, during the start or towards the end of the carbon conversion event. The commencement and termination of the carbon conversion event can be determined by the SGG controller and can be based on one or more parameters including, for example, time, temperature, and demand for syngas. One or more carbon conversion events can occur within heating process 300. The carbon conversion event can be terminated as determined by the SGG controller.

After terminating optional carbon conversion event in step 304, in step 305 the SGG controller determines the parameters for and commences an optional standby period. During standby period step 306, reducing or preferably shutting off the flow of reactants supplied to the SGG can beneficially reduce fuel consumption and rate at which heat is lost from the SGG (through a cooling effect of reactants passing through the SGG). Reducing the heat loss from the SGG can prolong the period prior to commencing a heating event, which can reduce the number of heating events in heating process 300, further resulting in reduced fuel consumption. Additional methods can be employed to reduce the heat loss from the SGG including, for example, employing thermal insulation around the SGG. During a standby period, the SGG will typically begin to cool over time. The SGG controller can terminate the standby period based on one or more parameters including, for example, demand for syngas, elapsed time, or the temperature of the SGG reaching a lower threshold temperature value.

In step 307 the SGG controller determines the parameters for and commences a heating event. In step 308a heating event is performed by enabling and adjusting the flow of fuel and oxidant reactants to the SGG and operating the SGG with an ER of slightly greater than or less than 1 in a fuel lean or fuel rich mode, respectively. An advantage of operating a heating event in fuel lean mode can be a reduction in fuel consumption, but a disadvantage can be the undesirable formation of oxides of nitrogen (NOx). Operating a heating event in fuel rich mode, on the other hand, can suppress NOx formation. The decision to operate a heating event in a fuel rich versus a fuel lean mode can be dependent on factors including, for example, the application and/or applicable regulations.

In an engine system with exhaust after-treatment assembly, the ER of an SGG during a heating event is preferably about 0.75 to 0.95, and more preferably about 0.9, in order to increase the heating rate of the SGG, suppress the formation of NOx, suppress the formation of carbon, and to produce a syngas with a reduced $H_2$ and CO concentration, for example, $H_2$+CO concentration of less than 10%. The reduced $H_2$ and CO concentration can be beneficial in potentially reducing the amount of CO slip past the exhaust after-treatment assembly when the exhaust after-treatment assembly is cool.

Determining the time at which to start a heating event can be based on one or parameters, for example, including:
 (a) Time; for example, elapsed time after the production of syngas or elapsed time since the demand for syngas has ceased or elapsed time since the flow of the reactants has been stopped. The output from the optional timer commenced in step 303 can be employed.
 (b) Temperature; for example, when the temperature of an SGG reaches a lower threshold temperature value.
 (c) An algorithm; for example, as illustrated in equations (1) or (2).

$$t_{Rstart} = P - t_p - \sigma - t_1 \qquad (1)$$

where:
$t_{Rstart}$=start time of heating event relative to the last syngas demand;
P=mean syngas demand period(s); the demand period is defined herein as an interval of time between syngas demand occurrences;
$t_p$=duration of a syngas pulse (s);
$\sigma$=standard deviation of period of syngas demand (s), abbreviated as STD DEV;
$t_1$=heating event duration (s).
Alternatively, $$t_{Rstart} = P - t_p - \sigma - t_1 - t_2 \qquad (2)$$

where:
$t_2$=optional correction factor (s).
Other example algorithms include:
$t_{Rstart}$=time of last syngas demand+(AVERAGE of last n syngas demand periods−heating event duration);
$t_{Rstart}$=time of last syngas demand+(AVERAGE of last n syngas demand periods−factor m×STD DEV−heating event duration);
$t_{Rstart}$=max time the SGG can stay above lower temperature threshold OR $t_{Rstart}$ as defined above, whichever comes first.

The duration of a heating event can determined based on one or parameters, for example, including:
 (a) Time; for example, elapsed time after the start of a heating event. The output from the optional timer commenced in step 303 can be employed;
 (b) Temperature; for example, when the temperature of an SGG reaches an upper threshold temperature value;
 (c) An algorithm; for example, as illustrated in equations (3).

$$t_1 = c^*(T_{max} - T_{rst}) \qquad (3)$$

where:

c=a constant factor;

$T_{max}$=the upper threshold temperature value as defined above in (b);

$T_{rst}$=the temperature of an SGG at the beginning of a heating event.

Individual heating events can employ one or more parameters and combinations within an overall heating process. For example, a first heating event can employ a time-based trigger and a second heating event can employ a temperature-based trigger, where the first and second heating events are within the same heating process, and/or the first heating event of future heating processes can employ a different parameter than the previous heating event. The SGG controller can terminate the heating event by shutting off the flow of reactants supplied to the SGG.

In some applications, the optional standby period of a carbon conversion event (for example, steps 305 and 306) can be omitted and a heating event (for example, steps 307 and 308) can follow a carbon conversion event (for example, step 304). In some applications, the standby period (for example, steps 305 and 306) and carbon conversion event (for example, steps 304) can be omitted and a heating event (for example, steps 307 and 308) can begin after the events and parameters (for example, step 303) have been determined at the beginning of the heating process 300.

Referring to FIG. 3, during step 309 the SGG controller can determine the parameters for and commence another standby period. During the standby period in step 310 the SGG will typically begin to cool over time. The SGG controller can terminate the standby period in step 310 based on one or more parameters including, for example, elapsed time, the temperature of the SGG reaching a lower threshold temperature value or a demand for syngas.

During step 311, some or all of steps 303 through 310 can be repeated as determined by the SGG controller. If the SGG controller determines or receives a demand for syngas during steps 303 through 310, the SGG controller can terminate heating process 300 and switch to steps 301 and/or 302. The SGG controller can record and store syngas demand parameters, for example, parameters recorded or employed during steps 301 through 311. The SGG operating process of FIG. 3 ends when the SGG controller receives a command, for example, to switch off the SGG.

Figure 4:
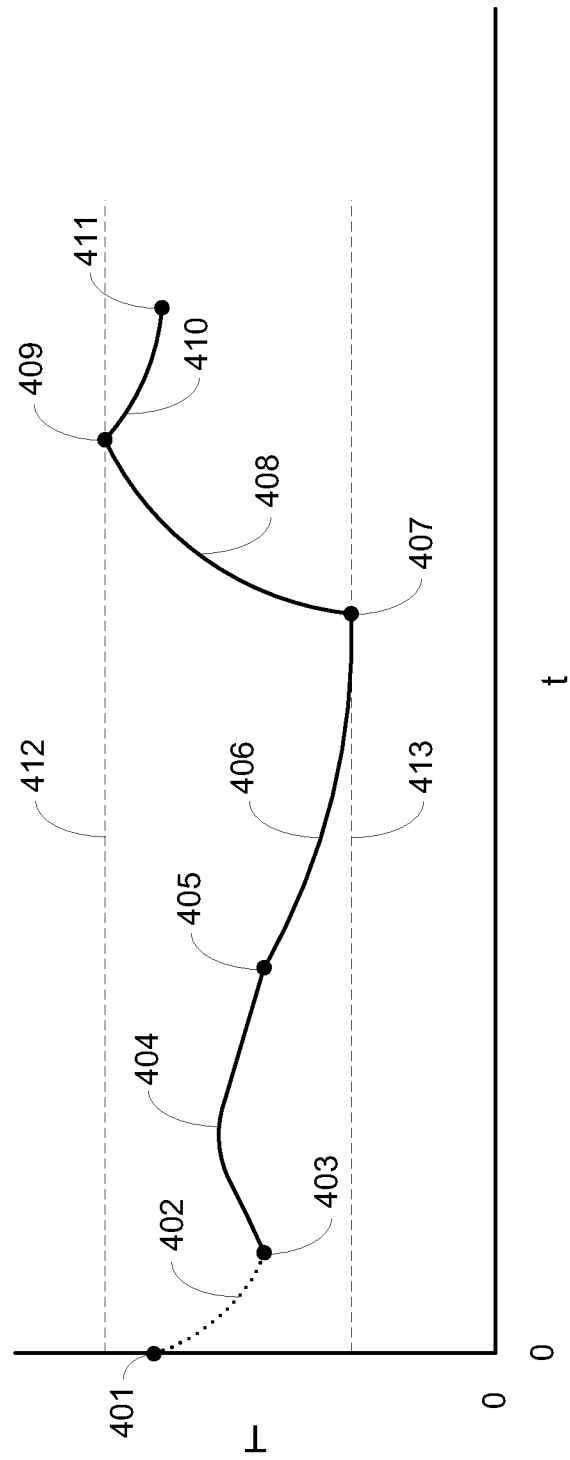
FIG. 4 is a graph (not necessarily to scale) illustrating an example plot of syngas generator (SGG) temperature over time with corresponding events.

FIG. 4 is a graphical illustration showing an example plot of SGG temperature over time, with temperature thresholds employed as parameters to commence or terminate certain events. Different portions of the plot in FIG. 4 correspond to the various events illustrated in FIG. 3. The graph is not necessarily to scale and the profile of the temperature plot can vary. The y-axis represents temperature (T) while the x-axis represents time (t). Starting at point 401 the SGG is operating within a desired operating temperature range, optionally producing syngas (for example, with an ER of about 0.75 to 0.95), when the SGG controller determines or receives a demand for syngas (for example, step 301 in FIG. 3). At dotted plot 402, the reactants supplied to the SGG are adjusted according to the demand for syngas, for example, to an ER in a range of about 0.3 to 0.35 (for example, step 302 in FIG. 3). As syngas is produced, factors that can affect the profile of dotted plot 402 include, for example, the ER of the reactants and the heat loss characteristics of the SGG. At the end of dotted plot 402 or at point 403, the SGG controller determines or receives a signal that the demand for syngas has ceased and the SGG controller signals and terminates the production of syngas (for example, step 302 in FIG. 3). Also at point 403, the SGG controller also determines the events and parameters for the heating process (for example, process 300 in FIG. 3).

During plot 404 the SGG controller commences and conducts an optional carbon conversion event (for example, step 304 in FIG. 3). Depending on factors including for example, the amount of carbon accumulated within the SGG and the oxygen concentration or oxygen molar flux of the oxidant reactant, the carbon conversion event can raise the temperature of the SGG to a peak value before decreasing as illustrated in plot 404 and extend the period for which the SGG remains at or above the temperature that it was when the carbon conversion event commenced (with a low or substantially minimal consumption of the fuel reactant). At point 405 the SGG controller commences a standby period (for example, step 305 in FIG. 3). During the standby period the reactants supplied to the SGG can be shut off. Plot 406 illustrates the fall in temperature of the SGG over time as no heat is produced within the SGG and heat is lost to the surrounding environment (for example, over step 306 in FIG. 3). The temperature of the SGG can be allowed to fall until the temperature reaches a lower threshold temperature shown as dotted line 413, at point 407, which can trigger the termination of the standby period. The lower threshold temperature can be selected based on one or more factors including, for example, an acceptable delay time to heat the SGG to a desired operating temperature and to produce syngas, fuel consumption, production of carbon, and syngas composition.

Also at point 407, the SGG controller commences a heating event by enabling and adjusting the flow of the reactants to the SGG. During plot 408 the SGG is operated with an ER of slightly greater than or less than 1 (step 308 in FIG. 3). Plot 408 shows the resulting increase in temperature of the SGG over the duration of the heating event, with the plot reaching an upper threshold temperature shown as dotted line 412 at point 409. At point 409, SGG controller terminates the heating event and shuts off the fuel and oxidant reactant supply to the SGG commencing another standby period (for example, step 309 in FIG. 3). This reduces fuel consumption, but allows the temperature of the SGG to fall. Plot 410 illustrates the fall in temperature of the SGG (for example, over step 310 in FIG. 3). At point 411 (step 311 in FIG. 3), if the SGG controller has not received or determined a demand for syngas, some or all of the steps corresponding to point 403 through plot 410 can be repeated as determined by SGG controller. If the SGG controller receives or determines a demand for syngas between points 403 through 411, the heating process can be terminated and the production of syngas can resume. For example, the reactants can be adjusted to an ER of less than 1 in a fuel rich mode and the production of syngas can start. If the demand for syngas can be predicted at least a short time in advance, it would be beneficial to directly precede the predicted syngas demand with a heating event so the SGG is hot or near a desired upper operating SGG temperature value when syngas production commences. The quality, or hydrogen and carbon monoxide concentration, of syngas produced can be increased by operating the SGG near the upper operating temperature limit with a low ER. However, over a prolonged period of producing syngas in a steady state mode it can be difficult to reach the upper operating temperature limit with a low ER.

Different parameters other than temperature thresholds can be employed to commence and terminate events during such a heating process. The sequence, type and number of events can vary. One or more different lower and/or upper temperature threshold values can be used, for example the upper threshold temperature for a carbon conversion event can differ from a heating event, or the upper temperature threshold for a first carbon conversion event can differ from a second carbon conversion event.

Figure 5:
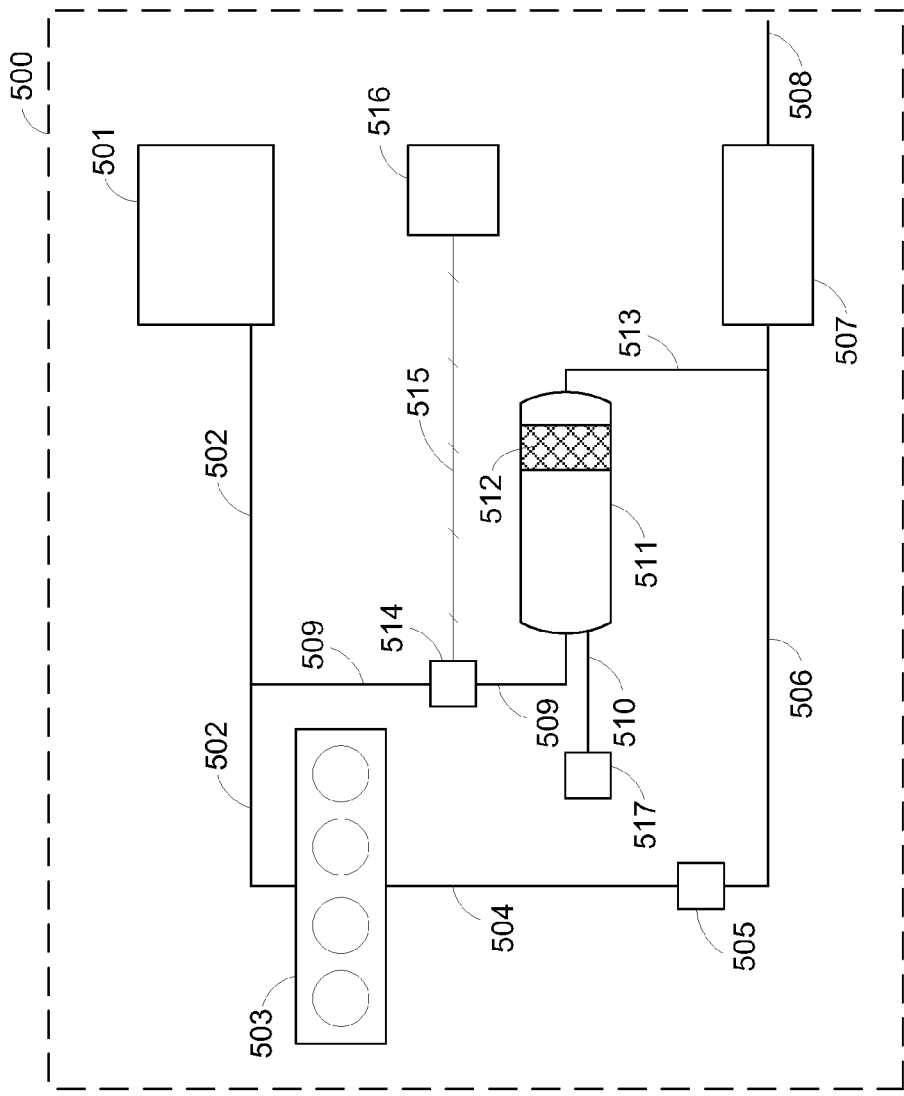
FIG. 5 is a simplified schematic drawing of an embodiment of an engine system comprising an engine, a fuel processor with an internal particulate filter, an exhaust after-treatment assembly and a controller.

FIG. 5 illustrates schematically an embodiment of an engine system 500 with an engine 503, a fuel processor 511, an exhaust after-treatment assembly 507 and an SGG controller 516. In the illustrated embodiment fuel processor 511 is a syngas generator (SGG). In FIG. 5, fuel tank 501 supplies a liquid fuel stream, through fuel supply line 502, to engine 503. An optional fuel filter, fuel pump, fuel pressure regulating device and fuel flow control device (all not shown in FIG. 5) can be integrated into fuel tank 501, or into fuel supply line 502. An optional fuel return line (not shown in FIG. 5) can return fuel back to fuel tank 501. Engine 503, could be a diesel, gasoline, liquefied petroleum gas (LPG), kerosene, natural gas, propane, methanol, ethanol, fuel oil, or other hydrocarbon, alcohol or suitably fueled engine of, for example, a compression ignition or spark ignition type. Engine 503 can be of various designs including reciprocating piston, Wankel, and gas turbine. The engine can be part of a vehicular or non-vehicular system. The engine typically comprises a conventional air supply subassembly (not shown in FIG. 5) to supply air to the engine.

Engine exhaust line 504 directs at least a portion of the engine exhaust stream, at least periodically, to exhaust after-treatment assembly 507, via optional turbo-compressor 505 and exhaust line 506. Engine exhaust line 506 and/or exhaust line 504 can incorporate other emissions reduction devices such as exhaust gas recirculation (EGR) systems (not shown in FIG. 5). Turbo-compressor 505 can contain an optional intercooler (not shown in FIG. 5). Exhaust after-treatment assembly 507, can comprise one or more exhaust after-treatment devices including, for example, Lean NOx Traps (LNTs), Diesel Particulate Filters (DPFs), Diesel Oxidation Catalysts (DOCs), Selective Catalytic Reduction (SCR), Catalytic Converter and associated valves, sensors and controllers, for reducing regulated emissions in the engine exhaust stream. The treated engine exhaust stream flows through exhaust pipe 508 and exits into the surrounding atmosphere.

In the illustrated embodiment, an oxidant reactant stream comprising ambient air is supplied and directed to SGG 511 via SGG oxidant inlet line 510 and air blower 517. Optional flow control devices (not shown in FIG. 5) and/or air blower 517 can receive signals from SGG controller 516 (control lines not shown in FIG. 5) to meter the oxidant reactant stream supplied to SGG 511. Optionally, instead or as well as ambient air, a portion of the engine exhaust stream from engine 503, and/or water or steam from a steam supply subassembly (not shown in FIG. 5) can be introduced into SGG 511 via oxidant inlet line 510 and/or via one or more other inlets, at some points or continuously during operation of SGG 511. A passive flow control device, located within SGG 511 (not shown in FIG. 5) can be used to meter the oxidant reactant stream. A fuel reactant stream from fuel tank 501, is supplied from fuel supply line 502 to SGG 511 via SGG fuel inlet line 509 and fuel metering device 514. An optional fuel filter, fuel pump, fuel pressure regulating device, fuel pre-heater and/or fuel heat exchanger (all not shown in FIG. 5) can be integrated into SGG fuel inlet line 509.

SGG 511 converts fuel reactant and oxidant reactant streams, into a product stream which can comprise, for example, syngas or flue gas. At least a portion of the product stream produced is supplied to syngas outlet line 513, via particulate filter 512 which is located within SGG 511. Particulate filter 512 collects carbon particulates from the product stream.

In FIG. 5 at least a portion of the product stream produced is at least periodically supplied via syngas outlet line 513 to exhaust after-treatment assembly 507. Syngas outlet line 513 can contain optional valves, sensors, controllers or similar equipment (not shown in FIG. 5). The product stream can be employed to regenerate one or more devices in exhaust after-treatment assembly 507, and can be directed to other hydrogen-consuming devices within the overall system, such as fuel cells (not shown) and/or to the engine itself. SGG controller 516 controls the ER of the fuel and oxidant reactants supplied to SGG 511 during periods of syngas demand and in between periods of syngas demand (for example, during a heating process). SGG controller 516 can communicate with fuel metering device 514 via communication line 515, which adjusts the mass flow of the fuel reactant. Optionally, the fuel reactant supply can be controlled via a passive flow control device and the ER can be adjusted by metering the oxidant reactant with an actively controlled metering device, or supply of both the fuel and oxidant reactant streams can be actively controlled by metering devices which can be adjusted inter-dependently or independently to control the ER.

In preferred embodiments of the present methods for operation of a fuel processor, the fuel processor is a non-catalytic partial oxidation syngas generator. The present methods could, however, offer advantages in other types of fuel processors, reformers or other reactors operating on different types of reactant mixtures. For example, the fuel processor could be of various types, such as a catalytic partial oxidizer, a non-catalytic partial oxidizer, and/or an autothermal reformer.

Embodiments of the above-described methods can be suitable for applications where an oxidant reactant contains molecular oxygen, for example, an air stream, by employing an ER as a parameter to control and adjust the reactants supplied to a fuel processor. Embodiments of the above-described methods can be suitable for applications where an oxidant reactant contains primarily chemically bound oxygen, for example, steam. When an exhaust gas stream from an engine is used as oxidant, a combination of ER ratio and O/C ratio can be used when appropriate to control and adjust the reactants supplied to a fuel processor.

The fuel supplied to the fuel processor can be a liquid fuel (herein meaning a fuel that is a liquid when under IUPAC defined conditions of standard temperature and pressure) or a gaseous fuel. Suitable liquid fuels include, for example, diesel, gasoline, kerosene, liquefied natural gas (LNG), fuel oil, methanol, ethanol and/or other alcohol fuels, liquefied petroleum gas (LPG), or other liquid fuels from which hydrogen can be derived. Alternative gaseous fuels include natural gas and propane. Fuels can include oxygenated fuels. In preferred embodiments of the present methods the fuel stream comprises diesel or gasoline.

The fuel processor can be deployed in various end-use mobile or stationary applications where a hydrogen-consuming device is employed. The product stream can be directed to one or more hydrogen-consuming devices for example an exhaust after-treatment device, a fuel cell, or an engine.

While particular elements, embodiments and applications of the present technology have been shown and described, it will be understood, that the invention is not limited thereto since modifications can be made by those skilled in the art without departing from the scope of the present disclosure, particularly in light of the foregoing teachings.

What is claimed is:

1. A method of operating a fuel processor in an engine system to intermittently produce a syngas stream comprising hydrogen ($H_2$) and carbon monoxide (CO) during first periods of time, interspersed with second periods of time, said method comprising:

during said first periods of time, supplying a fuel reactant stream and an oxidant reactant stream to said fuel processor and converting said fuel and oxidant reactant streams in said fuel processor to produce said syngas stream, wherein said fuel and oxidant reactant streams are supplied to said fuel processor at an equivalence ratio that is below that which would provide the maximum fuel-specific $H_2$+CO production and above that which would provide the maximum absolute $H_2$+CO production, and wherein during said first periods of time carbon accumulates in said fuel processor while during said second periods of time no fuel reactant stream is supplied, and only an oxidant reactant stream is supplied to said fuel processor to convert said carbon and generate heat to said fuel processor.

2. The method of claim 1 wherein the absolute $H_2$+CO production at said equivalence ratio is significantly higher than it would be if said fuel processor were operated at or close to the maximum fuel-specific $H_2$+CO production.

3. The method of claim 1 wherein said equivalence ratio is lower than a value where substantially all of the oxygen in said oxidant reactant stream supplied to said fuel processor is consumed by partial oxidation.

4. The method of claim 1 wherein said equivalence ratio is below that where the theoretical maximum carbon monoxide (CO) output can be achieved.

5. The method of claim 1 wherein the ratio of hydrogen ($H_2$) to carbon monoxide (CO) in said syngas stream produced during said first periods of time is greater than one.

6. The method of claim 1 wherein said equivalence ratio is below about 0.5.

7. The method of claim 1 wherein said fuel reactant stream and oxidant reactant stream are converted to said syngas stream in said fuel processor non-catalytically.

8. The method of claim 1 further comprising trapping said carbon in said fuel processor.

9. The method of claim 8 further comprising, during said second periods of time, selectively adjusting said oxidizing stream supply to convert said carbon in a manner which maintains the temperature of said fuel processor within a desired range.

10. The method of claim 8 wherein said oxidizing stream comprises said oxidant reactant stream.

11. The method of claim 8 wherein said oxidizing stream comprises water.

12. The method of claim 1 further comprising:
(a) recording at least one syngas demand parameter, thereby generating a record of historical syngas demand parameters;
(b) during said second periods of time, performing a heating process; and
(c) employing a predictive technique that employs said record of historical syngas demand parameters to control at least a portion of said heating process.

13. A method of operating a fuel processor in an engine system to intermittently produce a syngas stream comprising hydrogen ($H_2$) and carbon monoxide (CO) during first periods of time, interspersed with second periods of time, said method comprising:

during said first periods of time, supplying a fuel reactant stream and an oxidant reactant stream to said fuel processor and converting said fuel and oxidant reactant streams in said fuel processor to produce said syngas stream, wherein said fuel and oxidant reactant streams are supplied to said fuel processor at an equivalence ratio where carbon accumulates; and during said second periods of time supplying no fuel reactant stream, and only an oxidizing stream to said fuel processor to convert said carbon and generate heat to said fuel processor.

14. The method of claim 13 further comprising selectively adjusting said oxidizing stream to convert said carbon in a manner which maintains the temperature of said fuel processor within a desired range.

15. The method of claim 13 wherein said oxidizing stream comprises said oxidant reactant stream.

16. The method of claim 13 wherein said oxidizing stream comprises water.

* * * * *